Feb. 2, 1926.
C. J. IVEN
1,571,671
BUMPER FOR MOTOR VEHICLES
Filed Dec. 27, 1924
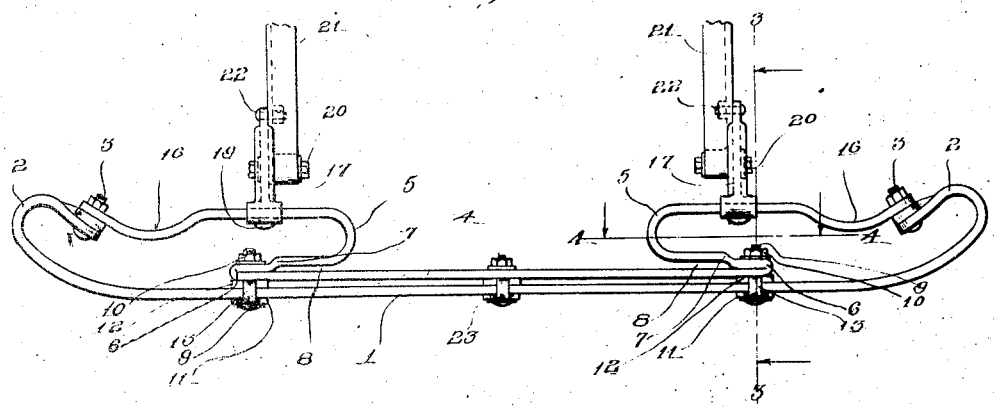
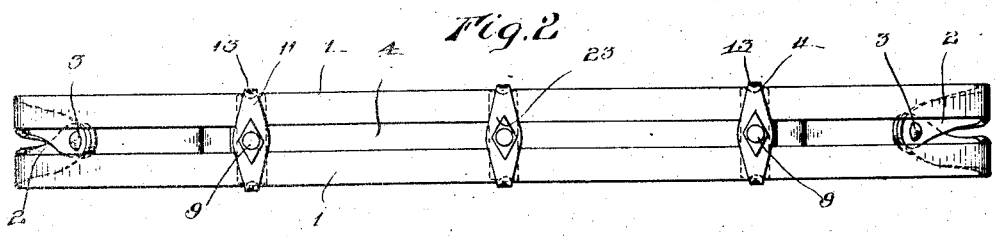
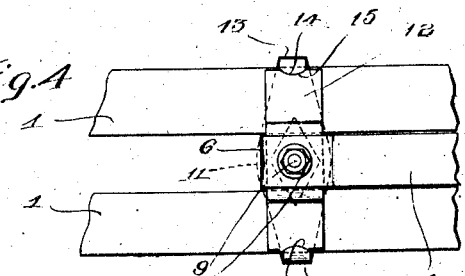
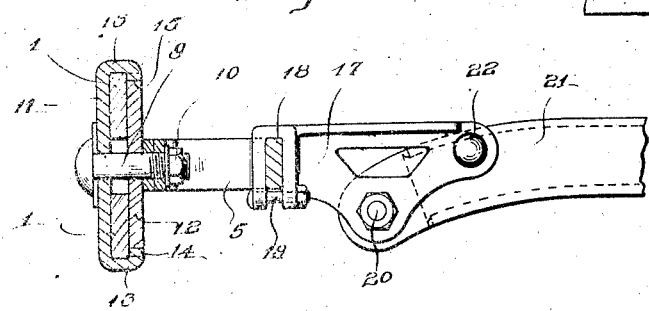
INVENTOR.
Chas. J. Iven.
BY
his ATTORNEYS.

Patented Feb. 2, 1926.

1,571,671

UNITED STATES PATENT OFFICE.

CHARLES J. IVEN, OF ROCHESTER, NEW YORK, ASSIGNOR TO J. H. SAGER COMPANY, OF ROCHESTER, NEW YORK, A CORPORATION OF NEW YORK.

BUMPER FOR MOTOR VEHICLES.

Application filed December 27, 1924. Serial No. 758,322.

*To all whom it may concern:*

Be it known that I, CHARLES J. IVEN, a citizen of the United States, and resident of Rochester, in the county of Monroe and State of New York, have invented certain new and useful Improvements in Bumpers for Motor Vehicles, of which the following is a specification.

The present invention relates to bumpers for motor vehicles, and an object thereof is to provide for that type of impact member formed of one or more strips of resilient metal supporting means which will add strength to the impact member, while, at the same time, permitting the flexing of the latter. A further object of the invention is to provide an improved resilient supporting means for the impact member of a bumper formed from laterally flexible material.

To these and other ends, the invention consists of certain parts and combinations of parts, all of which will be hereinafter described: the novel features being pointed out in the appended claims.

In the drawings:

Fig. 1 is a plan view of a bumper constructed in accordance with this invention;

Fig. 2 is a face view of the bumper;

Fig. 3 is a section on the line 3—3, Fig. 1; and

Fig. 4 is a section on the line 4—4, Fig. 1.

In the illustrated embodiment of the invention, there is provided an impact member formed, in this instance, from two strips 1 of flexible ribbon steel, said strips lying parallel with each other and having their ends turned rearwardly and toward each other, as at 2, to provide loops, the ends being connected together by bolts 3.

The supporting means for this impact member, in this instance, is formed of ribbon steel and embodies a central portion 4 which lies in rear of the space between the two impact members 1. At opposite ends of this central portion are formed the resilient supporting loops. Each of these resilient supporting loops embodies a horizontally arranged U shaped portion 5, one arm of which connects with the end of the central portion 4 by a bend 6, the middle of this arm lying in abutment with the rear face of the central portion and then being deflected at 7 so that it lies spaced from the central portion at 8. This arm is provided with an opening which is coincident with an opening adjacent the end of the central portion 4 so that a bolt 9 may pass through both openings.

This bolt 9 with its nut 10 is utilized for securing the supporting means to the impact member and to this end passes through two clamping members 11 and 12. The clamping member 11 lies in front of the impact member and has rearwardly extending portions 13 extending respectively above and below the upper and lower bars of the impact member, the ends of these rearwardly extending portions being provided with lugs 14 extending toward each other and on the rear faces of the impact member. The other clamping member 12 has its ends notched at 15 to receive the projecting portions 14, thereby causing the interlocking of the ends of the two clamping pieces 11 and 12, this interlocking relation being held through the bolt 9, the member 12 cooperating with the rear face of the impact member.

The other arm of the U shaped member 5 extends outwardly beyond the first mentioned arm and in rear thereof, its outer portion being provided with a bend 16 concaved on its rear side and convexed on its forward side and the extreme end being secured to the impact member by the bolt 3. The attaching bracket 17 is secured to the rear arm of the U shaped member 5 and to this end has a downwardly opening slot 18 in which the arm is held by a clamping bolt 19. This bracket may be secured by the shackle bolt 20 to the longitudinally extending frame bar 21 and by a bolt 22 passing through the frame bar in rear of the shackle bolt.

The supporting means is also secured at its extreme center to the impact bar by a clamping means 23 which is somewhat similar to the clamping means 11 and 12 which secures the supporting means to the impact member adjacent the longitudinal central portion 4, but differs due to the fact that only one thickness of the central portion 4 is present at this point.

While in the present embodiment the two springs of the supporting means are connected by a central portion, it is apparent that the invention is not limited to this central connection.

From the foregoing it will be seen that there have been provided two supporting springs, each of which has a portion extending outwardly from the attaching bracket to connect with an adjacent end of the impact member, this portion having a bend therein to facilitate the movement of the extreme end of the portion rearwardly when the end of the impact member is bent rearwardly. Each spring also has a spring connection between the attaching means and the impact member away from the end of the center of the latter, thereby permitting the flexing of the center and the end and providing a yielding support for the portion between the center and the end. The central connecting portion between the two springs tends to strengthen the middle of the impact member, while, at the same time, holding the two springs together so that chattering noise is prevented, the space between the springs and the central portion being provided to prevent chattering contact between the two parts.

What I claim as my invention and desire to secure by Letters Patent is:

1. A bumper comprising an impact member, supporting means for the impact member embodying a central portion and spring portions at opposite ends of the central portion, each having two arms lying in a horizontal plane behind the central portion, one of said arms being connected to the central portion by a bend, and attaching means secured to the other arm of each spring portion.

2. A bumper comprising an impact member, supporting means for the impact member embodying a central portion and two arms lying behind the central portion at each end of said central portion, one of said arms being connected to the central portion by a bend and lying in abutment with said central portion adjacent the bend, said arm also being deflected away from the central portion, and an attaching means connected to the other arm.

3. A bumper comprising an impact member, a central portion secured to the impact member, and a U shaped spring having two arms, arranged in rear of said central portion at each end of said central portion, one of said arms being longer than the other, the shorter arm being connected to the central portion by a bend and the longer arm being secured to the impact member, and an attaching means also secured to the longer arm.

4. A bumper comprising an attaching means, an impact member and two substantially U shaped springs, each having two arms, one of which is longer than the other, the longer arm having the attaching means secured thereto and extending on opposite sides of said attaching means and said longer arm being secured to the impact member adjacent the end of the latter and the shorter arm being secured to the impact member at a point between the end of the latter and the center of said impact member.

5. A bumper comprising a flexible impact member having its ends deflected rearwardly and inwardly, attaching means, and springs each having two arms, one of which is longer than the other and is secured between its ends to one of the attaching means, the free end of said longer arm being secured to the inwardly turned ends of the impact member and being provided with a bend which will permit the flexing of the impact member rearwardly and the shorter arm of the spring being secured to the impact member between the center of the latter and an end.

6. A bumper comprising an impact member, attaching means, and means for supporting said bumper from the attaching means, said supporting means embodying an arm extending outwardly from the attaching means and connected with the impact member adjacent its end and an arm extending outwardly in advance of the first mentioned arm from a point on the inner side of the attaching means and connected with the impact member between an end and the center of said impact member.

7. A bumper comprising an impact member having inwardly turned portions at its ends, supporting springs for said impact member, each having two arms extending in the same general direction, the inner of said arms being longer than the outer one and being secured to the inwardly turned end of the impact member and the shorter of said arms being secured to the impact member between the center of the latter and the end, and attaching devices secured to the longer arm of each spring.

8. A bumper comprising an impact member embodying two spaced bars, a supporting member lying in rear of said bars and means for securing the impact member to the supporting member embodying two clamping plates cooperating with the front and rear faces of the impact member, one of said plates having notches in opposite ends and the other of said plates having laterally turned portions engaging above and below the impact member and provided with lugs extending into the notches of the first mentioned plate, and a bolt passing through both plates and the supporting member.

CHARLES J. IVEN.